United States Patent [19]

Burger et al.

[11] Patent Number: 5,275,364
[45] Date of Patent: Jan. 4, 1994

[54] POLE-TYPE CAMERA SUPPORT

[76] Inventors: Richard L. Burger, 53853 Bruce Hill, Shelby, Mich. 48316; William Burger, 22633 Lakeland, St. Clair Shores, Mich. 48080

[21] Appl. No.: 911,402

[22] Filed: Jul. 10, 1992

[51] Int. Cl.⁵ ............................................. F16L 3/00
[52] U.S. Cl. ................................. 248/122; 354/76; 354/293; 358/229
[58] Field of Search ............. 248/122, 124, 125, 187, 248/183, 354.1; 354/76, 126, 293, 295; 358/229, 224

[56] References Cited

U.S. PATENT DOCUMENTS

| D. 302,561 | 8/1989 | Goins | D16/242 |
|---|---|---|---|
| 2,219,169 | 10/1940 | Alter | 248/183 X |
| 2,323,473 | 7/1943 | Korling | 248/183 |
| 2,431,100 | 11/1947 | Woods | 248/124 X |
| 2,632,617 | 3/1953 | Evans | 248/124 |
| 2,804,278 | 8/1957 | Jewett | 354/76 X |
| 3,227,509 | 1/1966 | Baker | 354/76 X |
| 3,289,563 | 12/1966 | Kent | 354/293 |
| 3,533,583 | 10/1970 | Azim | 248/125 |
| 3,586,278 | 6/1971 | Simons | 354/76 X |
| 4,174,900 | 11/1979 | Ina | 354/293 |
| 4,289,393 | 9/1981 | Kawazoe | 354/293 |
| 4,474,439 | 10/1984 | Brown | 352/243 |
| 4,530,584 | 7/1985 | Schmidt | 354/293 |
| 4,570,887 | 2/1986 | Banister | 248/187 |
| 4,589,622 | 5/1986 | Hutter | 248/649 |
| 4,621,785 | 11/1986 | Embra | 248/183 X |
| 4,684,230 | 8/1987 | Smith | 354/293 |
| 4,767,090 | 8/1988 | Hartman et al. | 248/168 |
| 4,933,691 | 6/1990 | Leslie | 354/81 |

Primary Examiner—J. Franklin Foss
Attorney, Agent, or Firm—Basile and Hanlon

[57] ABSTRACT

A camera support includes a pole formed of a first tubular member and two tubular end members telescopingly mounted in the first member and releasably extendable outward therefrom for supporting the pole between two opposed surfaces, such as a ceiling and a floor. An arm supports a camera at one end and is slidingly and rotatingly mounted to the first tubular member at another end for variable positioning of the camera with respect to the pole. The arm may alternately be configured with telescopingly engaged legs for adjusting the length of the arm with respect to the pole. A base with outwardly extending, pivotal legs may alternately be attached to the pole for supporting the pole in an upright position. A pair of carriers are attachable to the pole to mount the alternate base to the pole for transport with the camera support.

20 Claims, 6 Drawing Sheets

POLE-TYPE CAMERA SUPPORT

BACKGROUND OF THE INVENTION

1. Field of the Invention

The present invention relates, in general, to cameras and, more specifically, to camera supports.

Photographers frequently use tripods to support a camera in a fixed position both in a studio as well as in the field. Such tripods include a base through which a movable tubular member extends. A pan/tilt head which provides for rotation and angular positioning of the camera is mounted on one end of the tubular member and is connectable to a camera. The base is also provided with three adjustable length legs which are pivotally mounted to the base and extend angularly downward and radially outward therefrom.

While such tripods function effectively to stationarily position a camera, the legs of the tripod extend outward a considerable distance from the camera mounting base when extended to their full length. This poses a problem in crowded area since such legs are exposed to inadvertent contact with people. Such a problem becomes more troublesome when a tripod is used in a residential home to support a video camera or camcorder. When a video camera is mounted on a tripod for filming a large family gathering, for example, in the confined space of a residential home, the outward extension of the tripod legs takes up considerable space which may not be available in such crowded conditions. The tripod legs are also subject to frequent encounters with people which can jar or move the video camera. Further, the outward spread of the legs of a conventional tripod prevents easy access to the camera mounted on the tripod by a handicapped person in a wheelchair or bed.

Thus, it would be desirable to provide a camera support which securely supports a camera in a fixed position; but which takes up less space than previously devised camera supports. It would also be desirable to provide a camera support which provides adjustable and variable positioning of a camera. It would also be desirable to provide a camera support which is adjustable in length. It would also be desirable to provide a camera support which is collapsible into a small shape for easy storage and/or transport. Finally, it would be desirable to provide a camera support which provides easy access to the camera mounted thereon, especially by a handicapped person in a wheelchair or bed.

SUMMARY OF THE INVENTION

The present invention is a support for supporting a camera, such as a photographic camera, video camera, etc., in a fixed, stable position while allowing vertical, angular and tilt adjustment of the camera with respect to the support.

The camera support includes a pole means formed of a first tubular member having at least one and preferably two tubular end members telescopingly mounted in opposite ends thereof. Means are provided for releasably locking the first and second end members to the first tubular member in a variably selectable length position. Means are mounted on the outer ends of each of the first and second end members for fixedly engaging two spaced surfaces, such as a ceiling and a floor, respectively. An arm is provided for releasably supporting a camera on the first tubular member. Means are provided for slidably and rotatably connecting a first end of the arm to a first tubular member. Means are mounted on the second end of the arm for releasably attaching a camera to the arm.

In one embodiment, the support means includes a plate which is releasably engageable with an end of one of the first and second end members. A threaded boss may be formed on the plate to threadingly engage a threaded internal bore formed in the end of each of the first and second end members.

The connecting means, in one embodiment, comprises a hollow, tubular sleeve and means, connected to the sleeve, for releasably locking the sleeve to the first tubular member at any variably selectable position along the length of the first tubular member or at any angular position about the first tubular member. Clamp means are connected to the sleeve for fixedly clamping the sleeve to the first tubular member in a variably selectable angular or lengthwise position on the first tubular member.

The camera support of the present invention also includes means, connected between the first end of the arm and the sleeve, for pivotally attaching the arm to the sleeve. A flange is connected to and extends outward from the sleeve. A pair of circumferentially spaced bores are formed in the side edge of the flange. A pin is slidably mounted in the first end of the arm and retractably extends outward from the first end of the arm under a biasing force. The pin is releasably engageable with any of the bores in the flange to pivotally adjust the position of the arm with respect to the first tubular member.

In one embodiment, the arm has first and second rigidly fixed, angularly disposed legs. In a normal camera support, position, one of the legs extends substantially horizontally; while the other leg extends vertically from one end of the horizontally extending leg. The camera mounting means is connected to the end of the second leg of the arm and directly receives the camera thereon or indirectly through a conventional pan/tilt device for rotatably and pivotally mounting the camera to the second end of the arm.

In another embodiment, the arm includes a first leg portion having a first end connected to the sleeve. A second leg portion having a second end receiving the camera thereon is also provided. An intermediate leg portion telescopingly connects the first and second legs of the arm together and is clamped to each of the first and second legs in a fixed positional relationship with respect to the first and second legs of the arms for selectively varying the length and height of the complete arm with respect to the first tubular member.

In another embodiment, the second leg of the arm is slidably mounted on the first leg of the arm and is movable to any position along the length of the first leg of the arm.

The camera support of the present invention also includes extension members of a predetermined length which are removably mountable in the first and second end members to extend the overall length of the camera support if necessary. In addition, the extension members are removably attachable to a base in the form of a body having hinge members mounted at predetermined, angularly spaced positions thereon. The extension members are releasably engageable with the hinge members and extend radially outward from the base to provide a stable base for the camera support as an alternate to the use of the second end member and the support plate attached thereto.

A pair of carriers are provided to releasably attach the optional base and extension members attached thereto, or just the extension members themselves, to the first tubular member of the camera support to facilitate carrying of the base and extension members with the camera support. This expands the number of applications and conditions in which the subject camera support may be employed. Modified carriers may also be used to attach a conventional tripod to the first tubular member to transport a tripod along with the camera support.

The camera support of the present invention overcomes certain deficiencies encountered with the use of conventional camera tripods. The camera support of the present invention has a much smaller overall width than a tripod while still being capable of securely mounting a camera between two spaced surfaces, such as the ceiling and floor of a room. The camera support of the present invention is provided with various adjustment means to enable a camera mounted thereon to be positioned in any desired position, either horizontally, vertically or angularly with respect to the pole means of the camera support. The camera support of the present invention is also collapsible to a small, compact, overall size for easy storage and/or transport. Finally, the camera support provides easy access to the camera mounted thereon, especially by a handicapped person in a wheelchair or bed.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
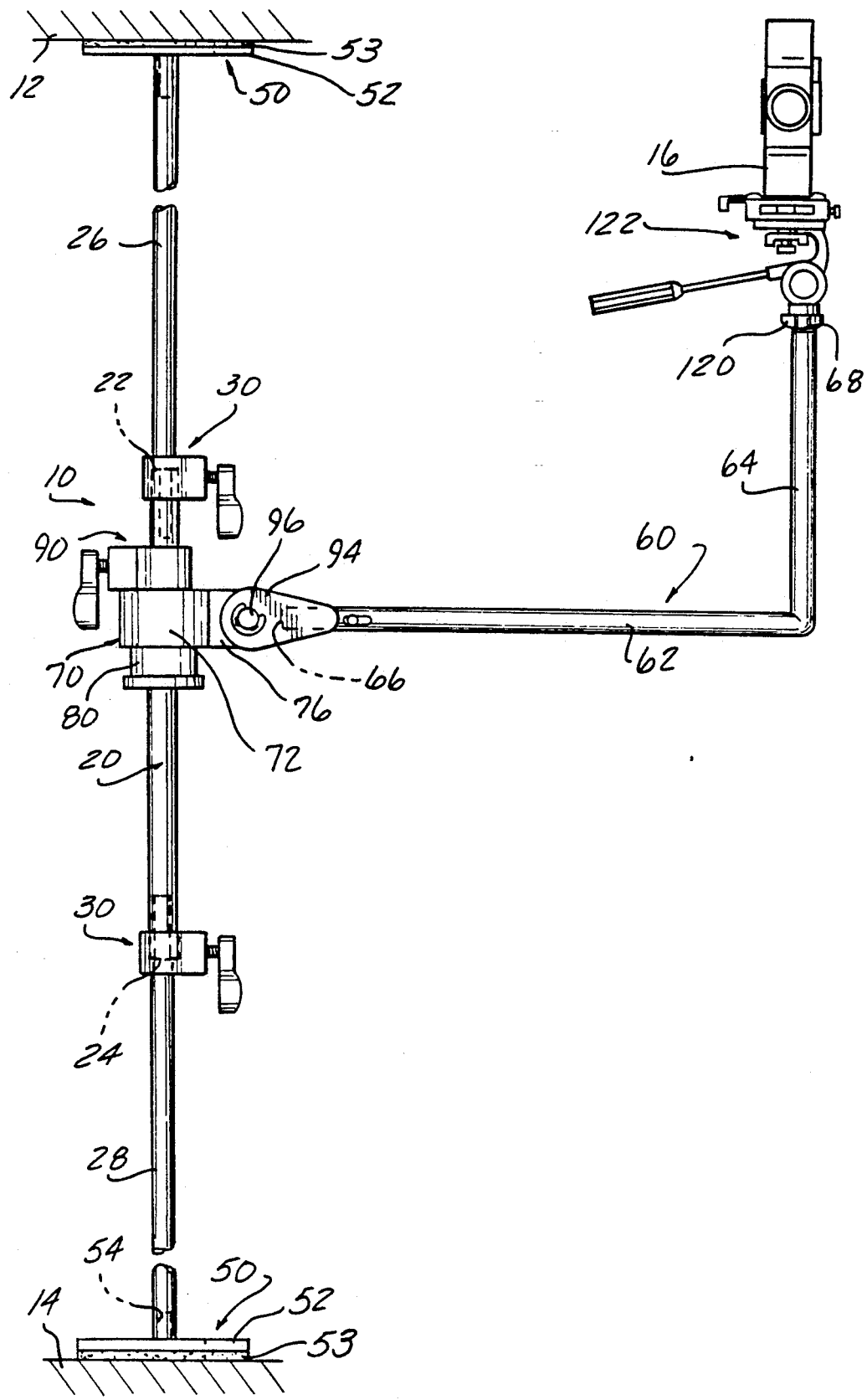
FIG. 1 is a front elevational view of the camera support of the present invention.

Referring now to the drawing, and to FIG. 1 in particular, there is illustrated a support 10 for fixedly yet adjustably supporting a camera between two opposed surfaces, such as a ceiling 12 and a floor 14 of a building, room, etc. The support 10 also includes various attachments to enable the support 10 to be used in other applications or conditions, as described hereafter.

By way of background, it will be understood that the support 10 is useful in supporting any type of photographic or optical device, such as a conventional still photographic camera, binoculars, a telescope, a motion picture camera, and the exemplary video camera or camcorder 16 shown in FIG. 1.

As shown in detail in FIG. 1, the camera support 10 includes a pole means having a first tubular member 20 formed of a hollow, cylindrical member of a suitable metal, plastic, etc. The first tubular member 20 has opposed first and second ends 22 and 24, respectively. At least one and, preferably, two end members 26 and 28, each in the form of a hollow, tubular member, are telescopingly mounted in the opposed first and second ends 22 and 24 of the first tubular member 20 and are extendable and retractable with respect to the first and second ends 22 and 24 of the first tubular member 20 to selectively vary the overall length of the pole means of the camera support 10.

Figure 3:
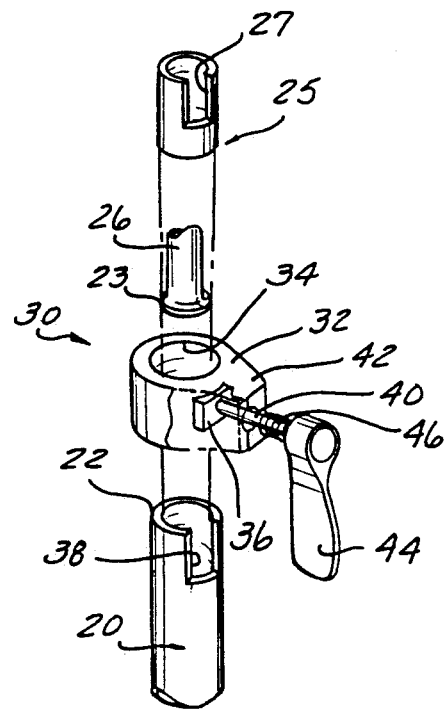
FIG. 3 is an exploded, perspective view showing a lock means for lockingly interconnecting the end members to the first tubular member shown in FIG. 1.

Although the first and second end members 26 and 28 may be freely mounted in and removable from the first tubular member 20, in a preferred embodiment shown in FIG. 3, one end of each of the first and second end members 26 and 28 such as the end 23 of the first end member 26, is flared outward to a slightly larger diameter than the remainder of the first end member 26; but is still sized to telescopingly slide within the first tubular member 20. A sleeve 25 is mounted in the end 22 of the first tubular member 20 after the flared end 23 of the first end member 26 has been inserted into the end 22 of the first tubular member 20. The sleeve 25 is welded or otherwise fixedly secured to the first tubular member 20 to capture and retain the first end member 26 in the first tubular member 20. A slot 27 is formed in and extends from one end of the sleeve 25 for reasons which will be described hereafter. A similar flared end and sleeve are provided for the second end member 28.

A lock means, denoted in general by reference number 30 and shown in detail in FIG. 3, is provided for releasably locking the first and second end members 26 and 28 in a desired lengthwise extended position with respect to the ends 22 and 24 of the first tubular member 20. Although any suitable lock means may be employed, in a preferred embodiment, and by way of example only, the lock means 30 includes a collar 32 having an internal bore 34 extending therethrough sized to slidably receive one of the ends of the first tubular member 20, such as the first end 22, as shown in FIG. 3, and the corresponding end of one of the end members, such as the first end member 26, also shown in FIG. 3. A clamp shoe 36 is mounted in an internal recess within the collar 32 and extends through a slot 38 formed in the first end 22 of the first tubular member 20 and the slot 27 in the sleeve 25 into engagement with the first end member 26. A shaft 40 extends through a threaded bore in an enlarged end portion 42 of the collar 32 and is connected to the clamp shoe 36 and an external handle or lever 44. A biasing spring 46 is mounted about the shaft 40 and seats between an exterior surface of the collar 32 and the lever 44 to exert a biasing force on the lever 44 and the clamp shoe 36. Rotation of the lever 44 in one direction, such as counterclockwise in the orientation shown in FIG. 3, will retract the clamp shoe 36 from engagement with the first end member 26 and from the slot 38 in the first tubular member 20 thereby allowing the first end member 26 to be extended or retracted with respect to the first tubular member 20. When the first end member 26 has been moved to the desired extended lengthwise position with respect to the first tubular member 20, the lever 44 is rotated in a clockwise direction to bring the clamp shoe 36 into a secure engagement through the slot 38 in the first tubular member 20 with the first end member 26 to securely hold the first end member 26 and the first tubular member 20 in fixed engagement at the desired extended lengthwise position. The clamp means 30 associated with the second end 24 of the first tubular member 20 and the second end member 28 functions in the same manner as that described above.

As shown in FIG. 1, support means 50 are attached to one end of the first and second end members 26 and 28 and provide an engagement surface between the first and second end members 26 and 28 of the pole means of the camera support 10 and a flat surface, such as a ceiling 12, a floor 14 or any other surface between which the camera support 10 can be securely mounted in a substantially vertical position. The support means 50 preferably comprises a planar plate 52 having an externally threaded boss 54 centrally mounted thereon and extending outward from one surface of the plate 52. The boss 54 threadingly engages internal threads formed in the end of the corresponding first or second end member 26 or 28 to removably attach the plate 52 to the corresponding first or second end member 26 or 28. It will also be understood that the support means 50 may be fixedly attached to the end members 26 and 28. A resilient pad 53 is mounted to the surface of the plate 52 opposite from the surface of the plate 52 having the boss 54 mounted thereon to cushion the engagement of the plate 52 with an adjacent surface as well as to protect the adjacent surface from damage when the camera support 10 is mounted thereto.

Figure 6:
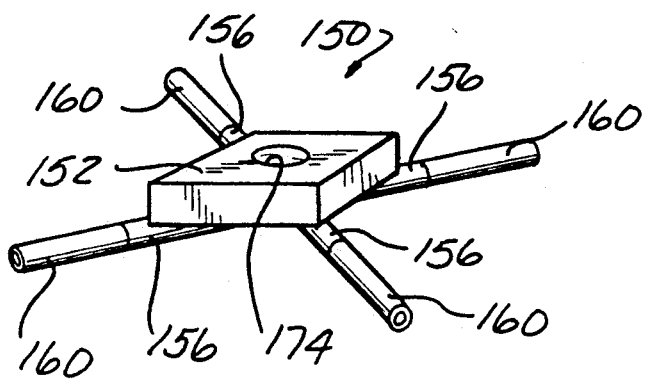
FIG. 6 is a perspective view of a base alternately usable with the camera support shown in FIG. 1.

Extension members, such as legs 160 shown in FIG. 6 in an alternate embodiment of the present invention, may be threadingly attached to the end members 26 and 28 to extend the overall length of the camera support 10 if necessary.

In use, the camera support 10 will be positioned in a substantially vertical position between two opposed surfaces, such as a ceiling 12 and a floor 14. The first tubular member 20 will typically be located substantially centrally between the opposed surfaces 12 and 14. The second end member 28 is then extended from the first tubular member 20 by releasing the lock 30 associated therewith to bring the plate 52 attached to one end of the second end member 28 into engagement with the floor 14, for example. The lock means 30 is then fixedly engaged to securely connect the second end member 28 to the first tubular member 20. The first end member 26 is then extended from the opposite end 22 of the first tubular member 20 to bring the support means 50 mounted thereon into engagement with a ceiling 12, for example. The lock 30 associated with the first end member 26 is then brought into a tight, secure engagement with the first end member 26 and the first tubular member 20. In this manner, the pole means of the camera support 10 is rigidly and securely mounted in a substantially vertical position between two opposed surfaces, such as a ceiling 12 and a floor 14.

The camera support 10 includes a camera support arm denoted in general by reference number 60 in FIG. 1. In one embodiment, the arm 60 is formed of a hollow tubular member or multiple, joined together members. In the case of multiple members or sections, the multiple members are fixedly joined together by welding, etc. As shown in FIG. 1, the arm 60 includes a first leg 62 which is oriented in a horizontal position when deployed in its normal supporting position. The camera support arm 60 also includes a second leg 64 which is fixedly connected to the first leg 62 and extends substantially vertically therefrom. The second leg 64 may also be disposed at any other suitable angle, other than the depicted 90° angle from the first leg 62. The arm 60 may be formed by bending a single elongated tubular member into the desired shape with the first and second perpendicularly disposed legs.

Figure 2:
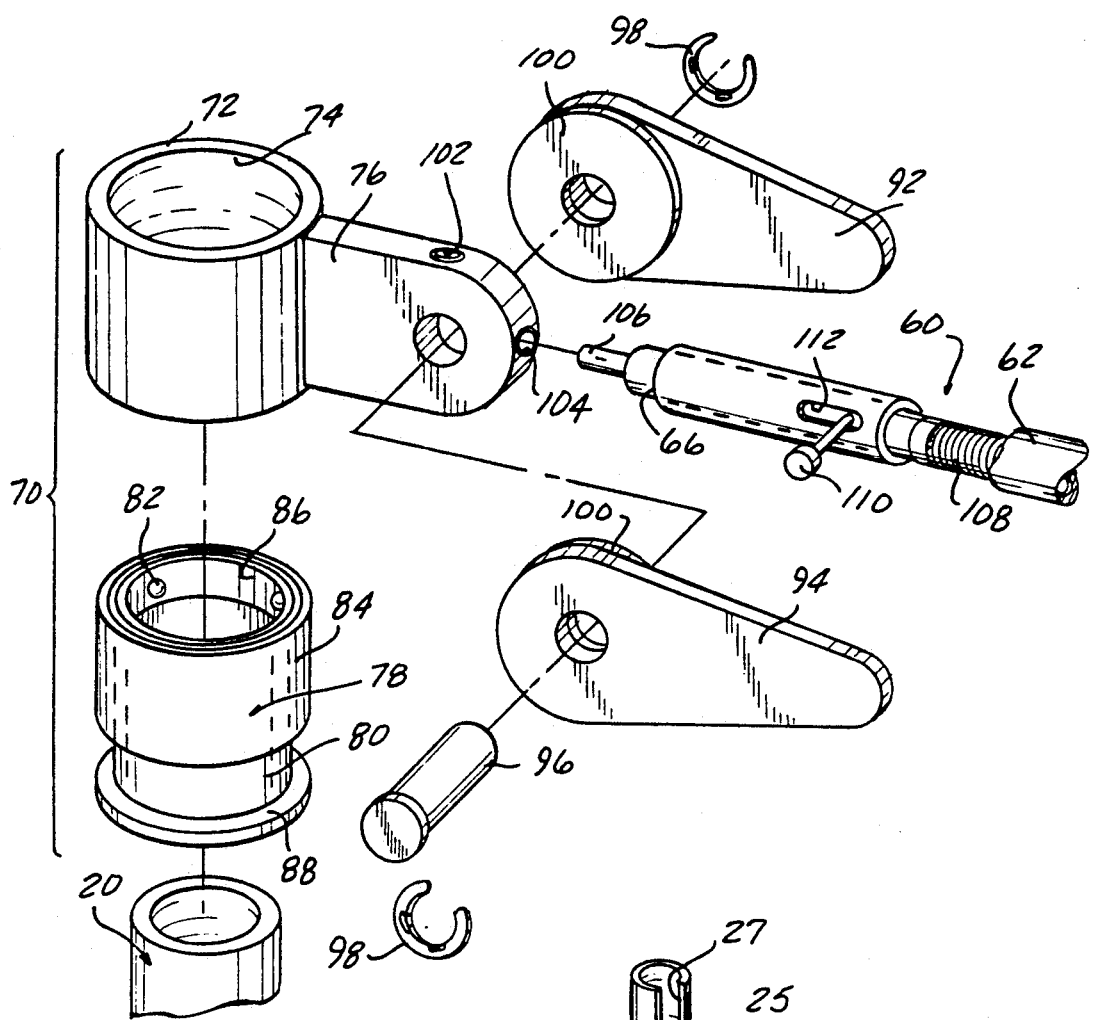
FIG. 2 is an exploded, perspective view showing the interconnection of the camera support arm with the hollow sleeve mountable about the first tubular member of the pole means.

The arm 60, as shown in FIG. 1, has a first end 66 formed at one end of the first leg 62 and an opposed second end 68 at the outer end of the second leg 64. The camera support 10 includes means 70 for slidably and rotatably connecting the first end 66 of the arm 60 to the first tubular member 20. As shown in FIG. 1, and in detail in FIG. 2, the connecting means 70 includes a sleeve 72 having a central bore 74 extending therethrough and a flange 76 extending radially outward from a side wall thereof. In an exemplary embodiment, a releasable clamp 78 is fixedly secured within the bore 74 of the sleeve 72 to provide selective movement of the sleeve 72 and the attached arm 60 to any desired position along the length of the first tubular member 20. By way of example only, the clamp 78 comprises a clamp sold by Bollinger under the trademark SLIPLOCK. This clamp, as shown in FIG. 2, includes a movable, generally cylindrical shaft 80 having a plurality of circumferentially spaced ball bearings mounted at one end. The shaft 80 slides within a tubular member 84 and is trapped therein by means of interconnecting, internal shoulders, not shown. Inclined ramps, also not shown, are formed in the shaft 80 and/or the tubular member 84 such that the ball bearings 82 extend outward from the shaft 80 when the shaft 80 is in the position shown in FIG. 2 into an internal bore 86 extending through the shaft 80 into fixed engagement with the first tubular member 20 which slidably extends through the bore 86. A downward force exerted on an annular flange 88 at one end of the shaft 80 pulls the shaft 80 partially out of the tubular member 84 and enables the ball bearings 82 to slide within their respective ramps and retract into the shaft 80 and out of engagement with the first tubular member 20 to enable the clamp 70 and the attached arm 60 to be moved to any desired position along the length of the tubular member 20. Release of the shaft 80 from its outward extended position will cause the ball bearings 82 to move into fixed engagement with the internally disposed first tubular member 20 thereby securely connecting the clamp 70 to the first tubular member 20 in the selected position along the length of the first tubular member 20.

Outward extension of the shaft 80, as described above, from the tubular member 84 of the clamp 70 also enables the clamp 70 and the attached arm 60 to be rotated about the longitudinal axis of the first tubular member 20 to any desired angular position Release of the shaft 80, in the same manner as described above, will bring the ball bearings 82 into engagement with the first tubular member 20 to securely connect the clamp 70 and the attached arm 60 in the desired angular position.

A lock means 90, substantially identical to the lock means 30 described above and shown in detail in FIG. 3, is fixedly secured to the sleeve 72 by welding, etc. The lock means 90 provides an additional securing force to fixedly retain the clamp 70 in the desired vertical and angular position on the first tubular member 20. Release of the lock means 90 enables the clamp 70 to be vertically and/or angularly rotated about the first tubular member 20 to bring the arm 60 into any desired vertical or angular position with respect to the first tubular member 20.

It will be understood that other connecting means which provide vertical and/or angular positioning of the arm 60 with respect to the first tubular member 20 may also be employed. For example, a rack and gear arrangement with suitable locking means may be used to selectively move the arm 60 up and down along the length of the first tubular member 20 to any desired position.

Figures 7, 8:
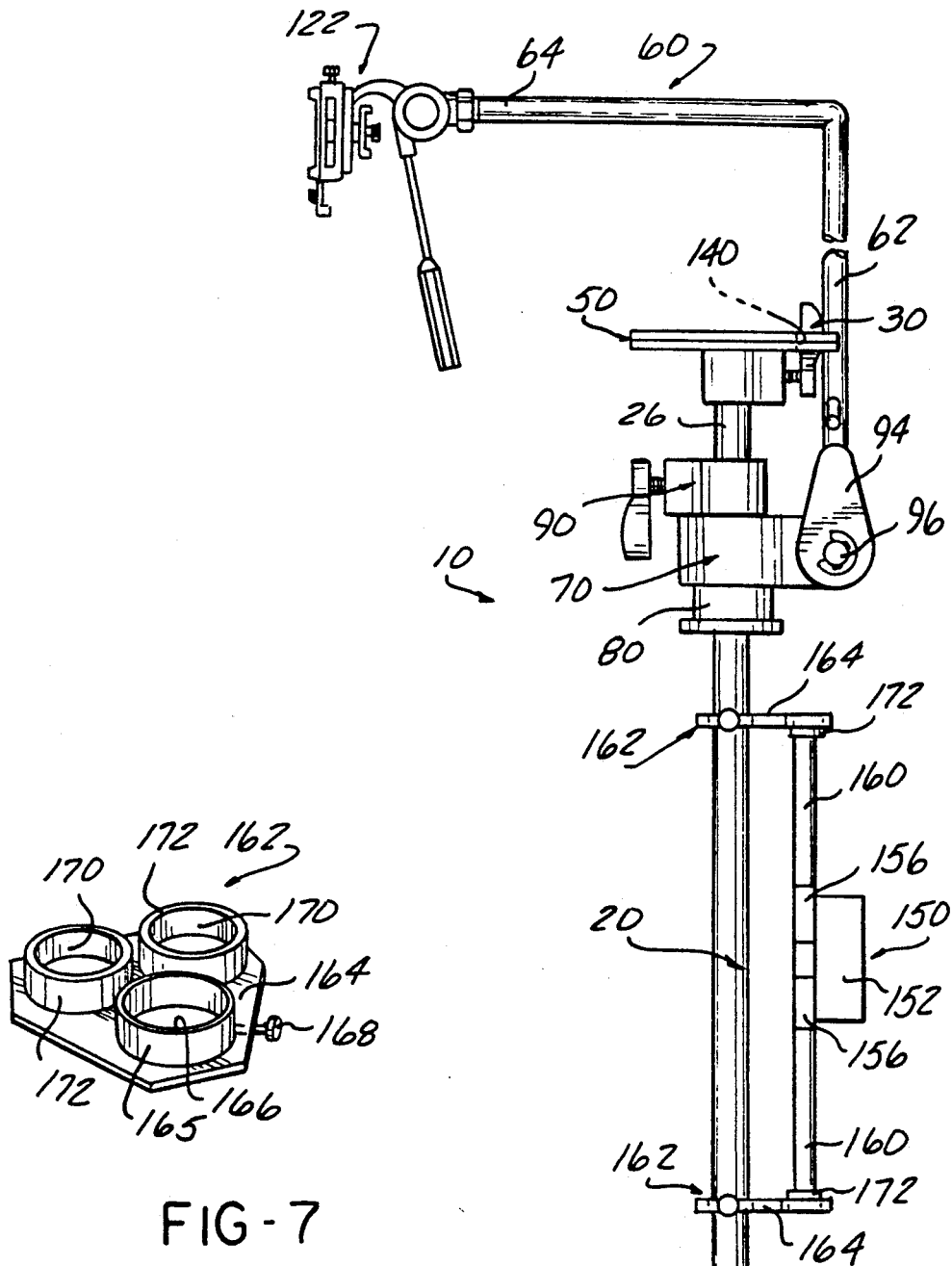
FIG. 7 is a perspective view of a carrier for mounting the base shown in FIG. 6 in a collapsed position on the first tubular member.
FIG. 8 is a front elevational view of the camera support shown in FIG. 1, with the base shown in FIG. 6 and the carrier shown in FIG. 7 mounted thereon and with the camera support in its collapsed position.

Although the arm 60 could be fixedly secured to the flange 76 of the sleeve 72, in a preferred embodiment, means are provided for pivotally attaching the first end 66 of the arm 60 to the sleeve 72 to provide for selective positioning of the arm 70 between a deployed, camera supporting position shown in FIG. 1 and a compact, collapsed position shown in FIG. 8 and described hereafter. A pair of spaced pivot members 92 and 94 are pivotally connected on opposite sides of the arm 76 extending outward from the sleeve 72 by means of a pivot pin 96 which extends through aligned bores formed in the pivot members 92 and 94 and the arm 76. C-nuts 98 are provided for holding the pivot pin 96 in the pivot members 92 and 94 and the arm 76. Bronze bearings 100 are mounted between the mating surfaces of the pivot members 92 and 94 and the arm 76. At least one and preferably two or more angularly spaced bores 102 and 104 are formed in the outer surface of the arm 76 generally perpendicular to the bore formed in the arm 76 through which the pivot pin 96 extends. Further, the pivot members 92 and 94 are fixedly attached to the first leg 62 of the camera support arm 60 by welding, etc.

The bores 102 and 104 are adapted to releasably receive a pin 106 which is retractably mounted in the first end 66 of the arm 60. The pin 106 is slidably mounted within the hollow first leg 62 of the arm 60 and is biased to a normally outward extending position as shown in FIG. 2 by a biasing means, such as a coil spring 108 press fit within the hollow interior of the first leg 62 of the arm 60. A lever 110 is mounted to the pin 106 and extends through a slot 112 formed in the leg 62 of the arm 60. The lever 110 enables the pin 106 to be manually retracted out of engagement with one of the bores 102 and 104 in the arm 76 to enable the camera support arm 60 to be pivoted to another position in which the pin 106 engages another of the bores 102 or 104. It will be noted that the bore 104 in the arm 76 corresponds to the normal deployed position of the camera support 10 as shown in FIG. 1. The bore 102 which is located substantially 90° from the bore 104 corresponds to the collapsed storage position of the camera support 10 which is depicted in FIG. 8. Additional bores may also be formed in the arm 76 at various angular spacings to provide different angular support positions for the camera support arm 60.

Referring again to FIG. 1, a camera 16 is removably mounted to the second end 68 of the arm 60 by suitable means. In an exemplary embodiment, a nut 120 is welded to the second end 68 of the leg 64 of the arm 60 and threadingly receives a conventional pan/tilt camera support device 122. As such pan/tilt camera support devices 112 are well known, a detailed description of the pan/tilt device 122 will not be provided herein. However, it will be noted that the camera 16 is releasably attached to the pan/tilt device 122 by means of suitable fasteners which engage one surface of the camera 16 to securely yet releasably attach the camera 16 to the pan/tilt device 122. The pan/tilt device 122 provides normal rotation, tilt and locking features to enable the camera 16 to be rotated about the longitudinal axis of the leg 64 of the camera support arm 60 as well as tilted from the vertical position shown in FIG. 1 to any desired angle up to and including a substantially horizontal position as is well known.

Figure 4:
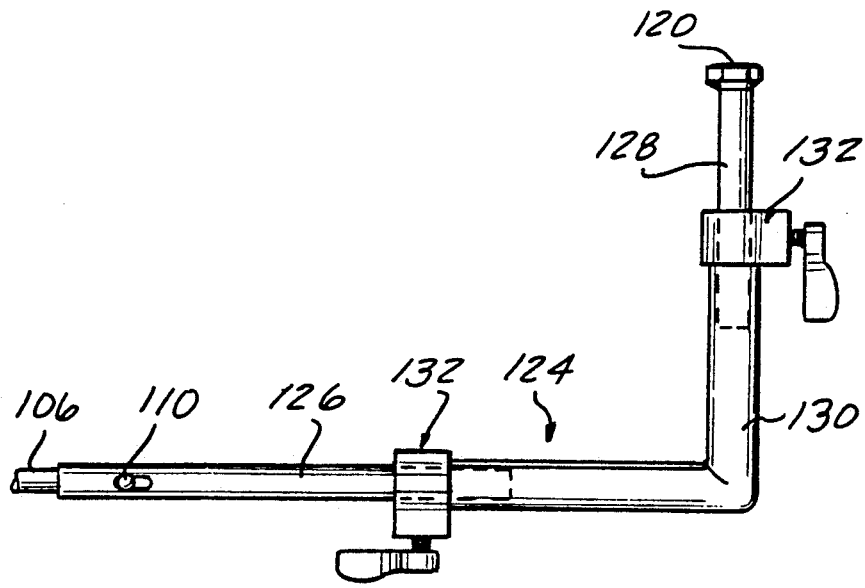
FIG. 4 is a front elevational view of another embodiment of the camera support arm.

FIG. 4 depicts an alternate embodiment of the camera support arm which connects the camera 16 to the first tubular member 20 via the connecting means 70. In this embodiment, the camera support arm 124 includes first and second leg members 126 and 128 which are similar to the leg members 62 and 64 of the camera support arm 60 described above and shown in FIG. 1, but are discrete, separate components. The retractable pin 106 is mounted at one end of the first leg 126 and the camera pan/tilt device attachment nut 120 is mounted at one end of the second leg 128. However, in this embodiment, the first and second legs 126 and 128 are telescopingly mounted for extendible and retractable movement in an intermediate leg 130. The intermediate leg 130 preferably has a 90° bend formed substantially centrally therein. Lock means 132 substantially identical to the lock means 30 described above and shown in FIG. 3 are provided at both ends of the intermediate leg 130 to releasably yet securely connect the first and second legs 126 and 128, respectively, to the ends of the intermediate leg 130 in the desired lengthwise dimensional positions. This arrangement enables the horizontal extension of the camera support arm 124 from the first tubular member 20 as well as the vertical position of the camera 16 with respect to the horizontally extending leg 126 to be selectively adjusted by a user after the pole means of the camera support 10 has been fixedly engaged between two spaced surfaces, such as a ceiling 12 and a floor 14 of a room.

Figure 5:
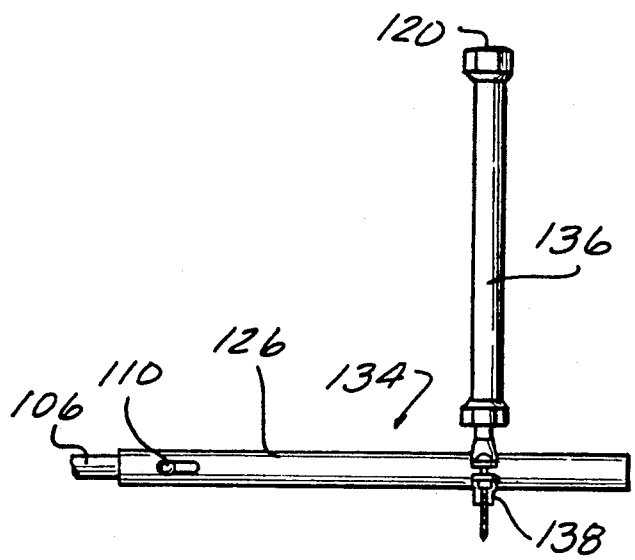
FIG. 5 is a front elevational view of yet another embodiment of the camera support arm.

Another embodiment of a camera support arm which may be employed in the camera support 10 of the present invention is shown in FIG. 5. In this embodiment, the camera support arm 134 includes a first leg 126 identical to the first leg 126 described above and shown in FIG. 4. A second leg 136 is variably positionable along the length of the first leg 126 by means of a releasable clamp 138 formed of opposed, generally U-shaped members, one of which is securely affixed to one end of the second leg 136 and the other of which is releasably engageable about the first leg 126 and attachable to the opposed clamp member by means of suitable fasteners. This structure enables the horizontal position of the second leg 136 to be selectively varied with respect to the generally horizontally extending first leg 126 after the pole means has been securely fixed between two spaced surfaces, such as a ceiling 12 and a floor 14 of a room, or otherwise mounted in a stationary position.

Before describing various accessories which may be advantageously employed with the camera support 10 of the present invention, a brief description of a collapsed, compact storage position for the camera support 10 for ease of storage and/or transport of the camera support 10 between uses will be provided in conjunction with FIG. 8. The camera support 10 may be collapsed from the normal deployed position shown in FIG. 1 by releasing the clamp means 30 connecting each of the first and second end members 26 and 28 to the first tubular member 20 and urging the first and second end members 26 and 28 to a fully retracted position within the first tubular member 20. Each of the clamp means 30 are then tightened to securely retain the first and second end members 26 and 28 within the first tubular member 20, as shown in FIG. 8. The pin 106 on the first end 66 of the clamp support arm 60 is then retracted out of engagement with the bore 104 in the arm 76 on the lock sleeve 72 and the clamp support arm 60 pivoted in a counterclockwise, generally upward direction to a storage position shown in FIG. 8 in which the horizontal leg 62 of the camera support arm 60 extends in a generally vertical direction. The pin 106 is then released such that the biasing spring 108 will urge the pin 106 into engagement with the bore 102 in the arm 76 thereby locking the clamp support arm 60 in the collapsed position shown in FIG. 8. In this position, the leg 62 of the camera support arm 60 engages an open-ended notch 140 which is formed in the support plate 50 attached to the second end member 26.

Referring now to FIG. 6, there is depicted a base 150 which may be alternately used with the camera support 10 to convert the pole-type camera support 10 to a quad-type support to securely mount the camera support 10 on a surface, such as a floor, ground, etc., where opposed surfaces, such as a ceiling or floor, are not available or where it is not possible to use the support plates 50. The base 150 includes a base member 152. A plurality of receivers 156 are attached to the base member 152 and are located generally at the corners of the base 150. The receivers 156 may be stationarily attached to the base 152 or, preferably, pivotally attached by suitable means, such as spring loaded ball plungers which engage one of at least two spaced bores each, not shown, formed in the bottom surface of the base 152 for each receiver 156 and generally establishing the angular position shown in FIG. 6 and an adjacent position in which each receiver 156 extends in parallel to one of the sides of the base 152. The receivers 156 threadingly receive a plurality of legs 160 which extend outward from the base 150 and provide lateral stability for the camera support 10. The legs 160 are pivotal, in the preferred embodiment, by means of the receivers 156 from the deployed angularly spaced position shown in FIG. 6 to a collapsed position in which two of the legs 160 on each side of the base 150 are deployed in close, generally parallel proximity, as shown in FIG. 8. In the collapsed position, two of the legs 160 extend in parallel from one side of the base 150 and the opposed pair of legs 160 extend in parallel from the opposite side of the base 150.

The legs 160 may also be alternately employed as extensions for the first and second end members 26 and 28 as described above, when not being used with the base 150.

A carrier 162, shown in FIG. 7, is used to attach the base 150 to the first tubular member 20 of the camera support 10 for storage and/or transport of the base 150 with the camera support 10. The carrier 162 includes a planar plate 164 of any suitable shape. A first annular collar 165 is formed on the plate 164. A first bore 166 is formed in the collar 165 and the plate 164 and is sized to slidably engage the first tubular member 20 of the camera support 10. A fastener, such as a set screw 168, extends through the plate 16 and the collar 165 into the bore 166 for securely connecting the carrier 162 in a fixed position on the first tubular member 20. A pair of recesses 170 are formed on the plate 164 by means of raised, annular collars 172 which extend outward from one surface of the plate 164. The two recesses 170 are sized to receive the ends of two of the legs 160 to attach the base 150 to the carrier 162. It will be noted that two carriers 162 are used to attach opposite legs 160 on the base 150 to the first tubular member 20. The carrier 162 may be releasably attached to the first tubular member 20 or be mounted on the first tubular member 20 at all times.

Referring again to FIG. 6, a bore 174 is formed in the upper base member 152 for receiving one end of the second end member 28 of the camera support 10. The bore 174 may be threaded to engage external threads which may be formed on the end of the second end member 28. Alternately, a raised boss, not shown, may be mounted in and extending outward from the bore 174 for threading engagement with the internal bores formed at the outer end of the second end member 28 to attach the pole means of the camera support 10 to the base 150. In the event that the second end member 28 is not provided with a flared end which is captured by the collar in the first tubular member 20 and is, therefore, removable from the first tubular member 20, the bore 174 in the base 150 will be sized to receive the end of the first tubular member 20 therein after the second end member 28 and clamp 30 have been removed therefrom.

Figure 9:
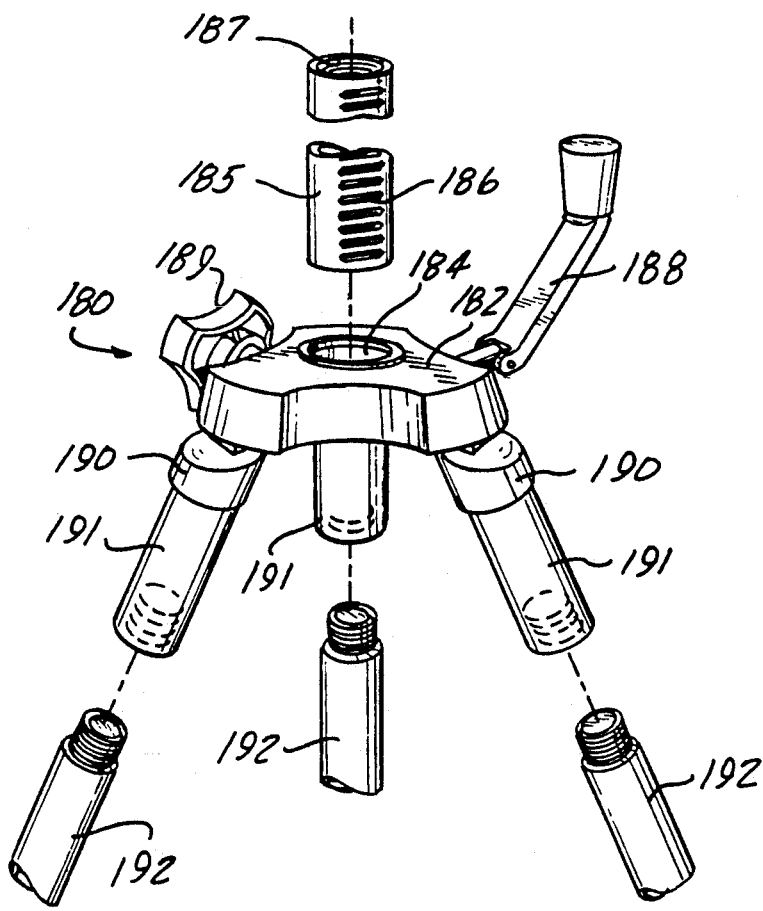
FIG. 9 is a perspective view showing a tripod base for alternate use with the camera support of the present invention.

FIG. 9 depicts a conventional tripod 180 which may be removable attached to and carried with the camera support 10 of the present invention to stably support the camera 16 when the camera support 10 cannot be used due to conditions in a particular location. The tripod 180 has a base member 182 having a bore 184 extending therethrough for receiving one end of a movable pole 185. The pole 185 includes a plurality of gear teeth 186 arranged in a rack which are engaged by a suitable drive gear, not shown, mounted in the base 182 and rotated by means of a handle 188 extending through and outward from the base 182. Rotation of the handle 188 enables the pole 185 to be vertically adjusted in position with respect to the base 182. A lock knob 189 also extends through the base 182 to lock the pole 185 in a fixed position.

A plurality of, i.e., three, hinged receivers 190 are pivotally mounted to a bottom surface of the base 182 and extend generally angularly outward therefrom in a normal, deployed position as shown in FIG. 9. Three legs 191 are threadingly engageable with the receivers 190 to support the base 182 on the ground or other surface. Three additional legs 192 are threadingly connected to the three legs 191.

The legs 191 and 192 may be pivoted from the outward, deployed position shown in FIG. 9 to a generally parallel, collapsed position through inward pivotal movement of the receivers 190. When the legs 191 and 192 are in the collapsed position and are generally parallel to each other, a lower carrier 194, shown in FIG. 10A, may be employed to releasably support the legs 192 of the tripod 180 on the first tubular member 20 in a similar manner as described above and shown in FIGS. 7 and 8. The carrier 194 includes a plate 195 having a raised peripheral edge 196. An annular collar 197 is formed on the plate 195. A bore 198 extends through the collar 197 and the plate 195 and slidably engages the first tubular member 20. A set screw 199 extends through the wall of the annular collar 197 into the bore 198 for fixing the carrier 194 in a desired position along the length of the first tubular member 20. The legs 192 of the tripod 180 rest on the plate 195 within the boundary of the raised peripheral edge 196 on the plate 195.

Figure 10B:
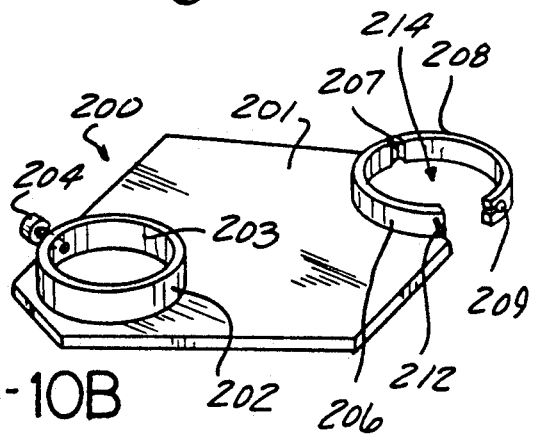
FIGS. 10A and 10B are perspective views of a pair of carriers usable to mount the base shown in FIG. 9 on the camera support shown in FIG. 1.
Figure 10A:
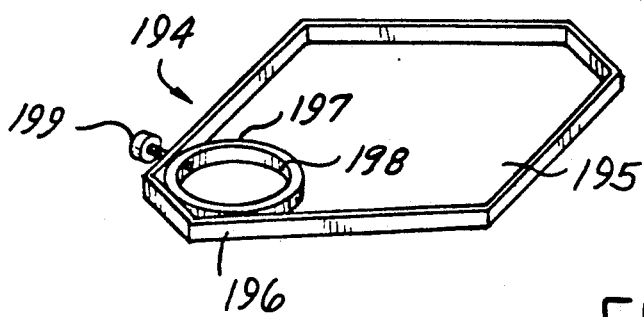

An upper carrier 200 shown in FIG. 10B is used with the lower carrier 194 and is designed to attach the pole 185 of the tripod 180 to the first tubular member 20. The upper carrier 200 includes a planar plate 201. A raised annular collar 202 is formed on the plate 201 and has a through bore 203 extending through the collar 202 and the plate 201 to slidably receive the first tubular member 20 therein. A set screw 204 extends through the annular collar 202 into the bore 203 to engage the first tubular member 20 to fix the upper carrier 200 thereto.

A two-part hinged clamp is also mounted on the plate 201 to engage the pole 185 of the tripod 180. The clamp includes a first semi-circular ring 206 which is formed in the plate 201. A hinge 207 connects one end of the first ring 206 to a second semicircular ring 208. The other end of the second ring 208 has a slot 209 which releasably engages a projection 212 formed on one end of the first ring 206 to clamp the first and second rings 206 and 208 together and to form a bore 214 therebetween which receives the pole 185 of the tripod 180.

The two carriers 194 and 200 thus support the tripod 180 alongside the first tubular member 20 for transport of the tripod 180 with the camera support 10.

Further, the hinged rings 206 and 208 can also be used in place on the annular collar 202 on the upper carrier 200, the annular collar 197 on the lower carrier 194 or even the annular collar 165 on the carrier 162 to mount each carrier 162, 194 and/or 200 about the first tubular member 20.

It will be noted that the legs 192 shown in FIG. 9 as well as the legs 160 shown in FIG. 6 which are used with the tripod 180 and base 150, respectively, may also be employed as the extension members to extend the length of the first and second end members 26 and 28 of the camera support 10, as described above. One or more of the legs 160 or 192 may be threadingly connected to each other and/or to the ends of the first and second end members 26 and 28 to extend the overall length of the camera support 10 for use in conditions where the spaced support surfaces 12 and 14 between which the camera support 10 is to be mounted are spaced far apart.

Further, the same pan/tilt support device 122 mounted on the camera support 10 may be likewise threadingly mounted on the internally threaded upper end 187 of the pole 185.

Referring now to FIG. 1; there is depicted another embodiment of a camera support 210 which includes a portion of the camera support 10 described above to stationarily position a camera 16 with respect to a floor or ground surface. In this embodiment, the camera support 210 includes the first tubular member 20 and the first and second end members 26 and 28, respectively. Lock means 30 are also used to releasably lock the first and second end members 26 and 28 in a desired lengthwise extended position with respect to the ends 22 and 24 of the first tubular member 20. In addition, one support means 50 in the form of a support plate 52 is threadingly mounted to the exterior end of the second end member 28 to support the pole means of the camera support 210 on a ground, floor or other horizontal surface.

However, in this embodiment, the camera support arm 60, the means 70 for slidably and rotatably connecting the camera support arm 60 to the first tubular member 20, and the associated lock means 90 are removed from the first tubular member 20. This is achieved by first removing the support means 50 from the first end member 26 and then removing the lock means 30 from the joint between the first tubular member 20 and the first end member 26 to enable the means 70 and the lock means 90 to be urged out of engagement with the first tubular member 20. The lock means 30 is then reinserted into engagement with the first tubular member 20, with the first end member 26 being locked in the desired extended position with regard to the first tubular member 20.

Since the support means 50 is removed from the outer end of the first end member 26, the internal bore in the outer end of the first end member 26 is exposed. The pan/tilt device 122 described above is then threadingly engaged in the outer end of the first end member 26 to mount a camera 16 to the pole means of the camera support 210.

In use, the pole means of the camera support 210 is adjusted to the desired length by telescoping the first and second end members 26 and 28 into or out of the first tubular member 20 before the associated lock means 30 are engaged to stationarily lock the first and second end members 26 and 28 in the desired extended position with respect to the first end member 20. The pan/tilt device 122 and camera 16 may have already been attached to the first end member 26 or it may be attached to the first end member 26 after the pole means has been adjusted to the desired overall length.

The user then places the camera support 210 on a support surface, such as a floor, ground surface, table, etc., by engaging the support plate 52 attached to the outer end of the second end member 28 with such support surface. The user holds the pole means of the camera support 210 in a substantially vertical position with one hand while adjusting the pan/tilt device 122 and/or operating the camera 16 with the other hand.

The support means 50 adds additional stability to the camera support 210 and is preferably employed in this embodiment. However, it will be understood that the support means 50 may be removed from the second end member 28 and the second end member 28 placed directly on the ground or other support surface 14 during use of the camera 16.

Figure 11:
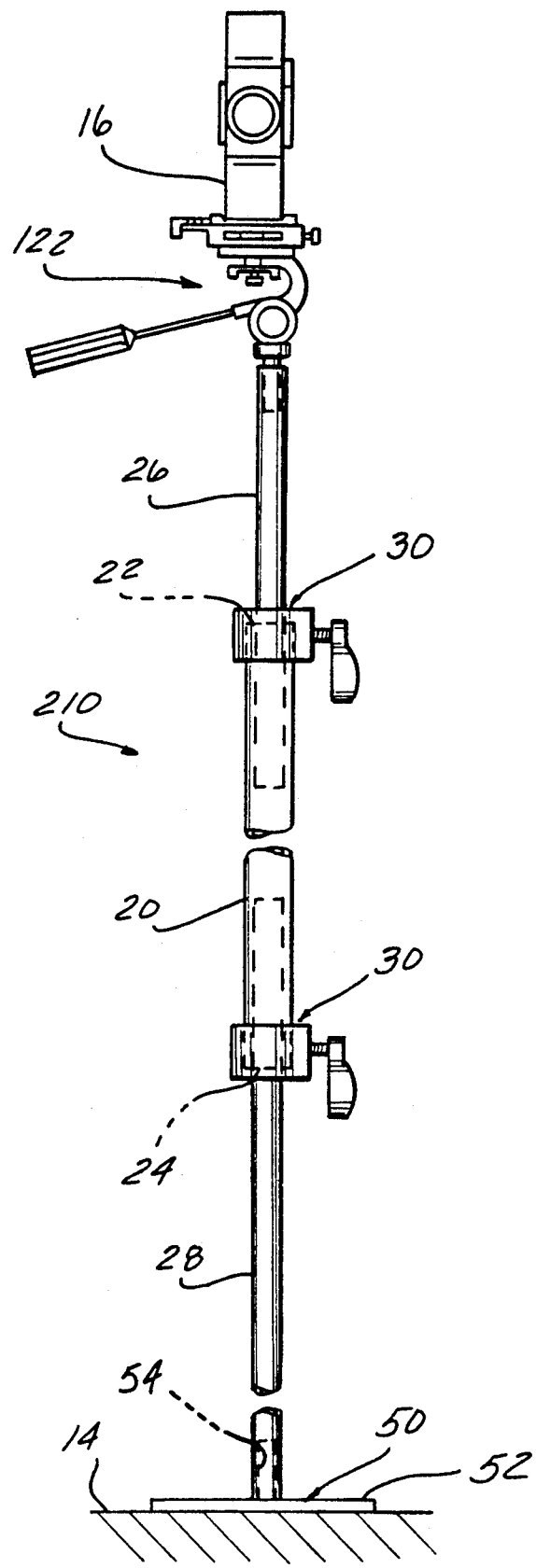
FIG. 11 is a front elevational view of another embodiment of the camera support of the present invention.

For additional stability, the base 150 shown in FIG. 6 may be employed with the camera support 210 shown in FIG. 11 by engaging the second end member 28 or the end 24 of the first tubular member 20 in the bore 174 in the base 150. The outwardly extending legs 160 connected to the base 150 provide lateral support to stably position the camera support 210 shown in FIG. 11 in a generally upright, vertically extending position.

The legs 160 shown in FIG. 6 or the legs 192 shown in FIG. 9 may be employed with the camera support 210 shown in FIG. 11 to extend the overall length of the camera support 210. In this situation, the legs 160 or 192 may be threadingly engaged with the outer ends of the first and second end members 26 and 28 in any number to provide the desired overall length for the camera support 210 as is desired by a user.

It will also be understood that the carrier 162 shown in FIG. 7 may be employed to releasably mount the base 150 to the camera support 210 shown in FIG. 11, as described above and shown in FIG. 8. Likewise, the carriers 194 and 200 shown in FIGS. 10A and 10B may be used, as described above, to releasably mount the tripod 180 shown in FIG. 9 to the first tubular member 20 of the camera support 210 shown in FIG. 11.

In summary, there has been disclosed a unique camera support for supporting a camera between two opposed surfaces, such as the ceiling and floor of a room. The camera support consumes a minimal amount of space thereby making the use of the camera support and the operation of the camera attached thereto significantly easier than with conventional camera tripods. The camera support of the present invention is simply constructed and may be extended to any desired length for mounting between two spaced, generally horizontal surfaces. At the same time, the camera is adjustably mounted on the camera support for vertical, horizontal and/or angular positioning as desired. The camera support of the present invention is also collapsible to a small, compact shape for ease of storage and/or transport. An alternate base with angularly disposed legs may be removably attached to the end of the tubular member or the second end member of the camera support in lieu of the horizontal support plates to enable the camera support to be stably employed in conditions where two spaced horizontal support surfaces are not available. In addition, a carrier can be mounted about the tubular member to attach the alternate base to the camera support for carrying purposes. Further, a similar carrier can be employed to attach a conventional tripod to the camera support for similar carrying purposes to enable the pan/tilt head mounted on the camera support to be used in conditions where the camera support cannot be mounted between two horizontal surfaces.

What is claimed is:

1. A camera support mountable between two spaced surfaces comprising:
   a first tubular member;
   first and second tubular end members telescopingly connected to the first tubular member;
   means for releasably locking the first and second end members to the first tubular member in a variably selectable length position;
   means, mounted on the outer ends of each of the first and second end members, for supporting the first and second end members and the first tubular member between two spaced surfaces;
   an arm having first and second ends;
   means for slidably and rotatably connecting the first end of the arm to the first tubular member;
   means, connected between the first end of the arm and the slidably and rotatably connecting means, for pivotally attaching the arm to the slidably and rotatably connecting means; and
   means for mounting a camera on the second end of the arm.

2. The camera support of claim 1 wherein the support means comprises:
   a plate; and
   means for removably attaching the plate to one of the first and second end members.

3. The camera support of claim 2 further comprising:
   a threaded boss formed on the plate; and
   the ends of the first and second end members having mating threads formed thereon for threading engagement with the boss on the plate.

4. The camera support of claim 2 further comprising:
   cushion means, connected to the plate, for cushioning the mounting of the plate to a surface.

5. The camera support of claim 1 wherein the connecting means comprises:
   a hollow sleeve;
   means, mounted on the sleeve, for releasably locking the sleeve to the first tubular member in a variably selectable position along the length of the first tubular member.

6. The camera support of claim 5 wherein the connecting means further comprises:
   clamp means, connected to the sleeve, for clamping the sleeve to the first tubular member in a fixed position.

7. The camera support of claim 1 wherein the mounting means comprises:
   pan/tilt means for rotatably and pivotally attaching the camera to the second end of the arm.

8. The camera support of claim 1 further comprising:
   extension members having a predetermined length removably mountable in the ends of the first and second end members.

9. A camera support mountable between two spaced surfaces comprising:
   a first tubular member;
   first and second tubular end members telescopingly connected to the first tubular member;
   means for releasably locking the first and second end members to the first tubular member in a variably selectable length position;
   means, mounted on the outer ends of each of the first and second end members, for supporting the first and second end members and the first tubular member between two spaced surfaces;
   an arm having first and second ends;
   means for slidably and rotatably connecting the first end of the arm to the first tubular member, the connecting means including a hollow sleeve and means, mounted on the sleeve, for releasably locking the sleeve to the first tubular member in a variably selectable position along the length of the first tubular member;
   means, connected between the first end of the arm and the sleeve, for pivotally attaching the arm to the sleeve, the pivotally attaching means including:
     a flange connected to and extending outward from the sleeve;
     means for pivotally connecting the first end of the arm to the flange;
     a plurality of circumferentially spaced bores formed on a side edge of the flange;
     a pin slidably mounted in the first end of the arm and retractably extending outward from the first end of the arm; and
     biasing means, mounted in the arm, for normally biasing the pin outward from the first end of the arm;
     the pin being retractable out of one of the bores in the flange for pivotal movement of the arm with respect to the first tubular member; and
   means for mounting a camera on the second end of the arm.

10. A camera support mountable between two spaced surfaces comprising:

a first tubular member;

first and second tubular end members telescopingly connected to the first tubular member;

means for releasably locking the first and second end members to the first tubular member in a variably selectable length position;

means, mounted on the outer ends of each of the first and second end members, for supporting the first and second end members and the first tubular member between two spaced surfaces;

an arm having first and second ends respectively formed on the ends of first and second angularly disposed legs;

means for slidably and rotatably connecting the first end of the arm to the first tubular member; and means for mounting a camera on the second end of the arm.

11. The camera support of claim 10 wherein the first leg extends in a substantially horizontal, normal support position; and the second leg extends in a substantially vertical, normal support position.

12. A camera support mountable between two spaced surfaces comprising:

a first tubular member;

first and second tubular end members telescopingly connected to the first tubular member;

means for releasably locking the first and second end members to the first tubular member in a variably selectable length position;

means, mounted on the outer ends of each of the first and second end members, for supporting the first and second end members and the first tubular member between two spaced surfaces;

an arm including:

a first leg having a first end;

a second leg having a second end;

an intermediate leg telescopingly connected at opposite ends to the first and second legs; and means for clamping the intermediate leg to the first and second legs in a variably selectable, dimensional relationship;

means for slidably and rotatably connecting the first end of the first leg of the arm to the first tubular member; and means for mounting a camera on the second end of the second leg of the arm.

13. The camera support of claim 12 wherein the intermediate leg includes angularly disposed first and second portions.

14. A camera support mountable between two spaced surfaces comprising:

a first tubular member;

first and second tubular end members telescopingly connected to the first tubular member;

means for releasably locking the first and second end members to the first tubular member in a variably selectable length position;

means, mounted on the outer ends of each of the first and second end members, for supporting the first and second end members and the first tubular member between two spaced surfaces;

an arm including:

first and second leg portions;

the first leg portion having a first end;

the second leg portion having a second end;; and means for slidably and locking mounting the second leg at a variable selectable position along the first leg;

means for slidably and rotatably connecting the first end of the first leg portion of the arm to the first tubular member; and means for mounting a camera on the second end of the second leg portion of the arm.

15. A camera support mountable between two spaced surfaces comprising:

a first tubular member;

first and second tubular end members telescopingly connected to the first tubular member;

means for releasably locking the first and second end members to the first tubular member in a variably selectable length position;

a base removably connectable to one of the first tubular member and the second end member;

a plurality of legs pivotally mounted on the base and extending outward from the base for supporting the base on a surface;

means, mounted on the outer ends of each of the first and second end members, for supporting the first and second end members and the first tubular member between two spaced surfaces;

an arm having first and second ends;

means for slidably and rotatably connecting the first end of the arm to the first tubular member; and means for mounting a camera on the second end of the arm.

16. The camera support of claim 15 wherein:

the legs are threadingly attached to hinged members mounted on the base.

17. The camera support of claim 15 further including:

a pair of carriers mountable in a spaced-apart manner about the first tubular member; and means, formed on each carrier, for receiving the legs of the base therein to releasably mount the base to the first tubular member.

18. A camera support mountable between two spaced surfaces comprising:

a first tubular member;

first and second tubular end members telescopingly connected to the first tubular member;

means for releasably locking the first and second end members to the first tubular member in a variably selectable length position;

a plate, mounted on one of the ends of each of the first and second end members for engagement with two spaced surfaces, with the first and second end members and the first tubular member rigidly extending between the two spaced surfaces;

an arm having first and second ends;

a hollow sleeve, the first end of the arm connected to the sleeve;

means, connected to the sleeve, for releasably locking the sleeve to the first tubular member in a variably selectable position along the length of the first tubular member; and clamp means, connected to the sleeve, for clamping the sleeve to the first tubular member in a fixed position.

19. The camera support of claim 18 wherein the pivotal attaching means comprises a flange connected to and extending outward from the sleeve;

at least one pivot member fixedly connected at one end to the first end of the arm and pivotally connected at another end to the flange;

a plurality of circumferentially spaced bores formed in the flange;

a pin slidably mounted in the first end of the arm and retractably extending outward from the first end of the arm; and biasing means, mounted in the arm, for normally biasing the pin outward from the first end of the arm;

the pin being retractable out of one of the bores in the flange for pivotal movement of the arm with respect to the first tubular member.

20. A camera support mountable between two spaced surfaces comprising:

a first tubular member;

first and second tubular end members telescopingly connected to the first tubular member;

means for releasably locking the first and second end members to the first tubular member in a variably selectable length position;

means, mounted on the outer ends of each of the first and second end members, for supporting the first and second end members and the first tubular member between two spaced surfaces;

an arm having first and second ends;

means for slidably and rotatably connecting the first end of the arm to the first tubular member;

means for mounting a camera on the second end of the arm;

a lower carrier mountable about the first tubular member for supporting the legs of a tripod thereon;

means, formed on the lower carrier, for releasably attaching the lower carrier to the first tubular member;

an upper carrier spaced from the lower carrier;

means formed on the upper carrier for releasably attaching the upper carrier to the first tubular member; and means formed on the upper carrier for supporting an end of a tripod therein to releasably mount a tripod to the first tubular member.

* * * * *

UNITED STATES PATENT AND TRADEMARK OFFICE
CERTIFICATE OF CORRECTION

PATENT NO.   : 5,275,364
DATED        : January 4, 1994
INVENTOR(S)  : Richard L. Burger and William Burger It is certified that error appears in the above-identified patent and that said Letters Patent is hereby corrected as shown below:

Column 8, line 7, 112 should be 122.

Column 10, line 5, 16 should be 164.

Column 11, line 56, FIG. 1 should be FIG. 11.

Signed and Sealed this

Twelfth Day of July, 1994

BRUCE LEHMAN

Attest:

*Attesting Officer*          *Commissioner of Patents and Trademarks*